United States Patent [19]

Case

[11] 4,103,314
[45] Jul. 25, 1978

[54] MOTION CONTROL SYSTEM

[75] Inventor: William John Philip Case, Winchester, England

[73] Assignee: International Business Machines Corporation, Armonk, N.Y.

[21] Appl. No.: 806,566

[22] Filed: Jun. 14, 1977

[30] Foreign Application Priority Data

Jun. 30, 1976 [GB] United Kingdom ............... 27317/76

[51] Int. Cl.$^2$ ...................... G11B 21/08; G11B 21/10; G05B 19/24
[52] U.S. Cl. ...................................... 360/78; 360/77; 318/571
[58] Field of Search ................... 360/78, 77; 318/571, 318/561, 636

[56] References Cited

U.S. PATENT DOCUMENTS

| 3,936,876 | 2/1976 | Taylor ................................. 360/78 |
| 4,031,443 | 6/1977 | Droux et al. .......................... 360/78 |

Primary Examiner—Robert S. Tupper
Attorney, Agent, or Firm—Robert Moss

[57] ABSTRACT

Positioning and motion control of two objects, for example, of a transducer and a disk record medium having tracks including pre-recorded servo information, is achieved in two modes of operation in the following manner:

During a track following mode the transducer is connected in a closed servo loop and position error signals derived by the transducer are used to energize an actuator mechanism coupled to the transducer so as to maintain the transducer in the on-track position.

During a track seek mode, the actuator is energized to cause the transducer to follow a desired velocity profile, at least a part of which is achieved with the transducer connected in a closed servo loop. The loop is fed with position error signals derived by the transducer sampled at times calculated to coincide with the on-track positions of a transducer following the desired velocity profile. The servo system responds as in track following mode to energize the actuator mechanism so as to reduce the instantaneous transducer position error from the true on-track positions during this part of the access operation with the overall effect of causing the transducer to follow the desired velocity profile more closely.

13 Claims, 4 Drawing Figures

MOTION CONTROL SYSTEM

BACKGROUND OF THE INVENTION

1. Field of the Invention

The invention relates to motion control systems for controlling relative motion between two objects along a predetermined path of travel and, in particular, to a disk file head positioning system.

2. Description of the Prior Art

Relative motion of two objects along a predetermined path of travel according to a predetermined velocity profile and their positioning at a predetermined relative position has conventionally been controlled by circuitry employing a position transducer for indicating the position and a tachometer for measuring the velocity of said objects. The tachometer velocity is compared with a desired velocity to control the motion in a closed loop servo system and the final position is maintained at the end of said motion also by closed loop servo system in response to the position transducer output. Track crossing signals derived from the position transducer output are used in conjunction with a difference counter and non-linear digital to analog converter are used to generate the desired velocity signal.

A representative description of such a system for controlling the motion and positioning of heads relative to concentric tracks on a disk record medium may be found in an article "Design of a Disk File Head-Positioning Servo" by R. K. Oswald (IBM Journal of Research and Development, November 1974, pp. 506-512). In early disk files external position transducers, such as an optical grating and photocell arrangement or an electromagnetic resolver, were used to define the data head position over a data track. In the Oswald article, the position transducer is effectively formed by a servo head and servo position reference information on a servo disk to permit a data head, movable with the servo head, actually to follow a data track of interest.

In such prior systems, the position transducer signals have also been employed in tachometer circuitry for deriving the head velocity from a combination of integrated motor current and the differentiated position transducer signals. Such a tachometer circuit is shown in U.S. Pat. No. 3568059 (Sordello). In that patent, a differentiated discontinuous position signal is sampled in its accurate linear regions and is used to reset periodically a velocity signal output generated primarily by the integrated motor current. The sampling times are determined from the magnitude of the position signal itself and occur when the position signal is linear. The Sordello patent indicates that the derived velocity signal may be employed in a "bang-bang servo" for moving a load to a desired location.

In addition to the dedicated servo disk track following systems described in the Oswald article, there is known, in the prior art, a type of disk file in which servo information is recorded in a plurality of spaced sectors between larger data sectors of concentric information storage tracks on a disk record medium. Such a system is described in U.S. Pat. No. 3185972 (Sippel). An advantage of such a system is that the servo information is physically located in the data tracks of interest which can, therefore, be followed with greater accuracy. The servo sectors must be sampled at times defined by clock signals to enable a position error signal to be generated for track following purposes. The Sippel patent refers to but does not describe a coarse positioning system for moving the head between tracks.

Thus in the prior art, only indirect use has been made of position error signals to control motion of objects between reference positions spaced in the direction of travel. Such signals have been employed directly as control signals only to maintain the objects in a predetermined relative position.

SUMMARY OF THE INVENTION

It is an object of the invention to provide a motion control system for controlling relative motion between two objects along a predetermined path of travel.

It is a further object of the invention to control such motion by generating samples of a position error signal at times calculated to coincide nominally with zero error reference positions of a position transducer and to derive a motor control signal from said samples.

It is yet another object of the invention to provide a disk file head positioning system in which a closed servo loop for controlling track following movement of a head is also employed for controlling head velocity during a track access motion.

These and other objects of the invention are achieved by the provision of a position transducer defining a plurality of reference positions along the path of a travel of an object which is being driven by a motor according to a predetermined velocity profile. Means are provided for generating timing signals which nominally should coincide with arrival of the object at selected ones of said reference positions. Deviations of the object from the predetermined velocity profile result in non-zero position error signal samples from the transducer which are fed back to control the motor directly. In a sector servo disk file context, where means for sampling the servo sectors and feeding back a position error signal during a track following operation already exist, the same sampling and feedback components are employed during track access movement to synchronize the timing of the track crossings, and thus the head velocity, with the timing of the sectors.

BRIEF DESCRIPTION OF THE DRAWINGS

In order that the invention may be fully understood, a preferred embodiment thereof will now be described with reference to the accompanying drawings, in which.

DESCRIPTION OF THE PREFERRED EMBODIMENT

Figure 1:
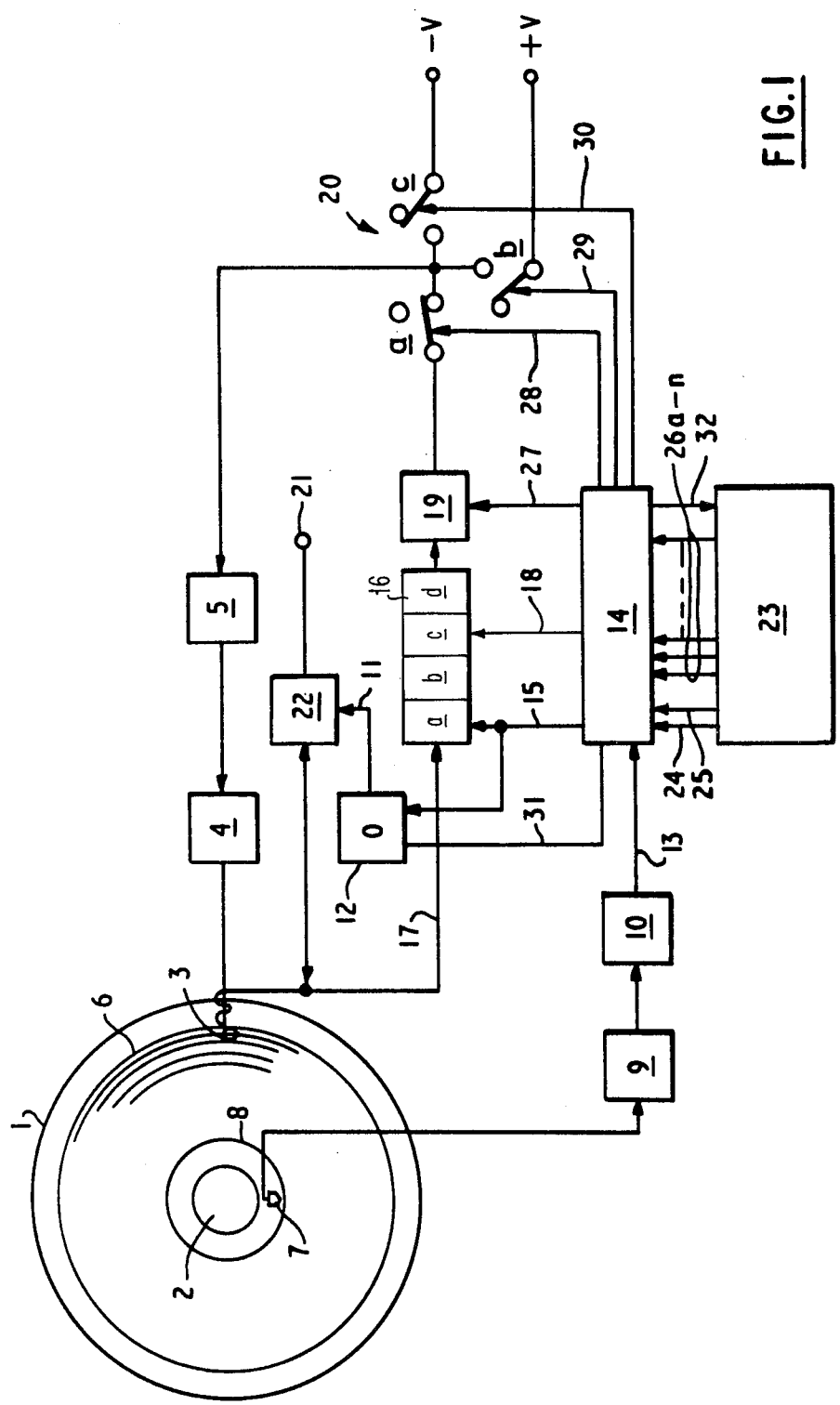
FIG. 1 shows in block form storage apparatus embodying the present invention.

Storage apparatus embodying the present invention is shown in FIG. 1 of the drawings. The storage medium is a magnetic recording disk 1 mounted for rotation about a spindle 2. A magnetic record and playback head 3 is movable radially across the disk 1 by means of an actuator 4 supplied with current of appropriate magnitude and polarity from power amplifier 5. Servo information on the disk 1 defines a plurality of concentric data tracks 6 on the disk surface for the recording and playback of data. The servo information is pre-recorded in sectors around each associated data track and is encoded so as to provide zero position error signal for all-on-track positions. The magnitude and polarity of the position error signal for off-track positions indicates the magnitude and direction of displacement of the record and playback head 3 from the on-track position. The particular manner in which the servo information is encoded to provide this position information has little bearing on the present invention and many alternatives are available. One suitable method of encoding servo information is described and claimed in U.S. Pat. No. 3691543 (Mueller). Although there are many suitable alternatives, it will be assumed for the purposes of the present description that the servo information prerecorded in sectors on the disk 1 is in the form described in the aforementioned patent specification.

A fixed head 7 is provided to read timing information from a servo timing track 8 pre-recorded on the disk in the vicinity of the spindle 2. The signals generated by the head 7 are amplified by pre-amplifier 9 and shaped by decoder 10 to provide sector timing pulses the leading edge of which indicates the start, and the trailing edge the end, of corresponding servo sectors on the data tracks. The this embodiment of the invention there are 72 sectors of servo information each of 330 bytes in length around each data track. Accordingly, 72 sector timing pulses each of servo sector length are generated for each revolution of the disk. The pulses are supplied over line 13 to control logic 14 where they are used to generate demodulator gating signals which are supplied over line 15 to a switch circuit 16a at the input of servo demodulator 16.

There are two modes of operation of the apparatus shown in FIG. 1. When in the "track following" mode the head 3 is held accurately positioned over a selected data track 6 so that data may be written on or read from data sectors of the tracks located between the servo sectors supplying the position information for that track. The position information is derived by the head 3 reading servo sectors from the data tracks 6. Demodulation circuitry 16b of demodulator 16 derives position error signals from the sampled servo information which are used to close the track following loop and hold head 3 on track in a conventional manner. The derivation of such position error signals from servo encoded tri-bit patterns is fully described in the aforementioned U.S. Pat. No. 3691543. Circuitry 16b of demodulator 16 corresponds to block 60, FIG. 1, of U.S. Pat. No. 3691543. A difference in the present embodiment is that the servo information is not continuously available but only available during servo sector time. Accordingly, demodulator 16 is only conditioned to accept data supplied over line 17 from head 3 during servo sector time. This is achieved under control of demodulator gating pulses supplied over line 15 to switch circuit 16a as will be described more fully later.

From a study of the tri-bit patterns, it will be apparent that the resulting position error signal inverts its polarity from one track to the next. Thus, if the head is track following over an odd-numbered track for example and is displaced off-track in a particular direction, the error signal produced will be of opposite polarity to that produced when the head is displaced offtrack in the same direction from track following over either of the two adjacent tracks. A track polarity signal supplied from control logic 14 over line 18 to an inverter circuit 16c of demodulator 16 inverts the error signal for alternate tracks. In this embodiment, the track polarity signal is arbitrarily chosen as having a down-level for even numbered tracks and an up-level for odd numbered tracks. The effect of this track polarity signal, which changes its level mid-way between tracks, is to cause the demodulator 16 to supply the position error signal at its output unchanged when track following over odd numbered tracks but to invert the polarity of the position error signal at its output when track following over even numbered tracks. The unambiguous position error signal from inverter circuit 16c of the demodulator 16 is stored between sectors in storage circuit 16d, the stored position error signal being supplied via a conventional lead-lag compensator 19 and three position switch 20, contact a of which is shown closed, to power amplifier 5. The power amplifier responds to the compensated position error signal to energize the actuator 4 so as to move the head 3 in a direction tending to reduce the position error signal to zero. Such closed loop track-following systems are well known in the art and further details are unnecessary for the understanding of the present invention.

When the head 3 is not required to read servo information from the servo sectors then it is available for use as a normal data record/playback head for transferring data to and from the data input/output terminal 21 in a conventional manner. The portion of the data channel shown in FIG. 1 includes read/write electronics 22 which is inhibited during servo sector time by the demodulator gating signal on line 15 which is further supplied as one input to OR-gate 12, the output of which one line 11 is a read electronics inhibit signal. There are many ways in which this type of circuit control can be achieved using a simple two level signal and further details are unnecessary for the understanding of the present invention.

The apparatus is put into its "track access" mode by a seek signal supplied from an external control unit 23 over line 24 to control logic 14. The control unit which may, for example, be a file controller or part of a CPU also supplies the number of tracks to be crossed during the access and the direction of the access. No other information is required from the control unit. In this embodiment the direction of access is defined as IN when the head is to be moved towards the disk spindle and OUT when it is to be moved away from the disk spindle. This direction information is conveyed by a two level signal on line 25 which is at its up-level for an IN seek and down-level for an OUT seek. The number of tracks to be crossed is supplied as a binary coded number over a number of lines 26a – n to the control logic 14. The control logic 14 provides the signals to various parts of the apparatus to cause the head 3 to perform the desired access.

Figure 2A:
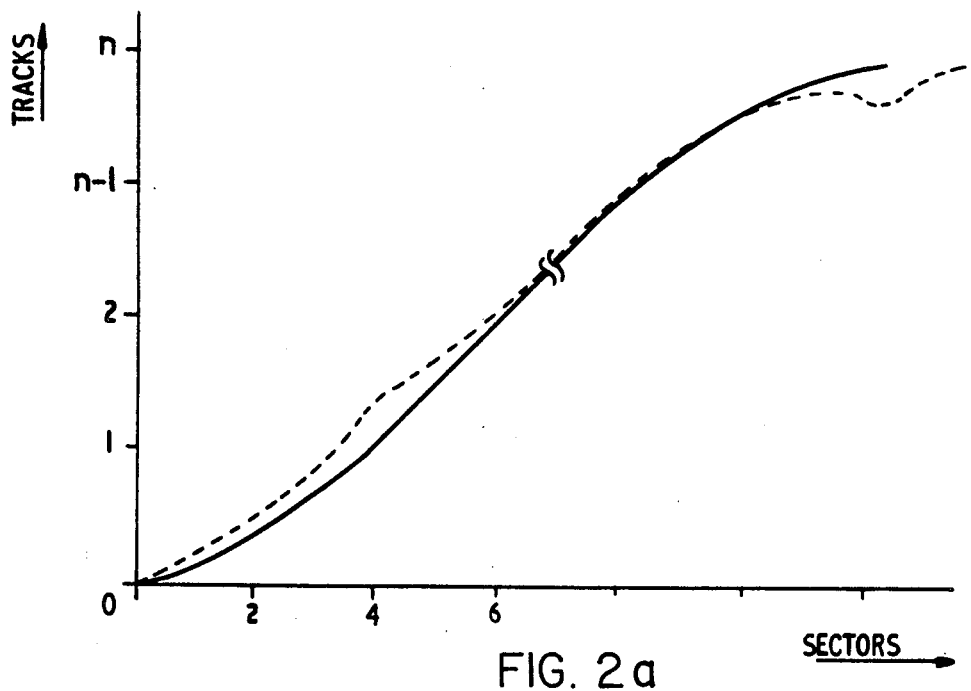
FIG. 2 including 2a and 2b shows typical access velocity and access acceleration curves for a track access over n tracks.
Figure 2B:
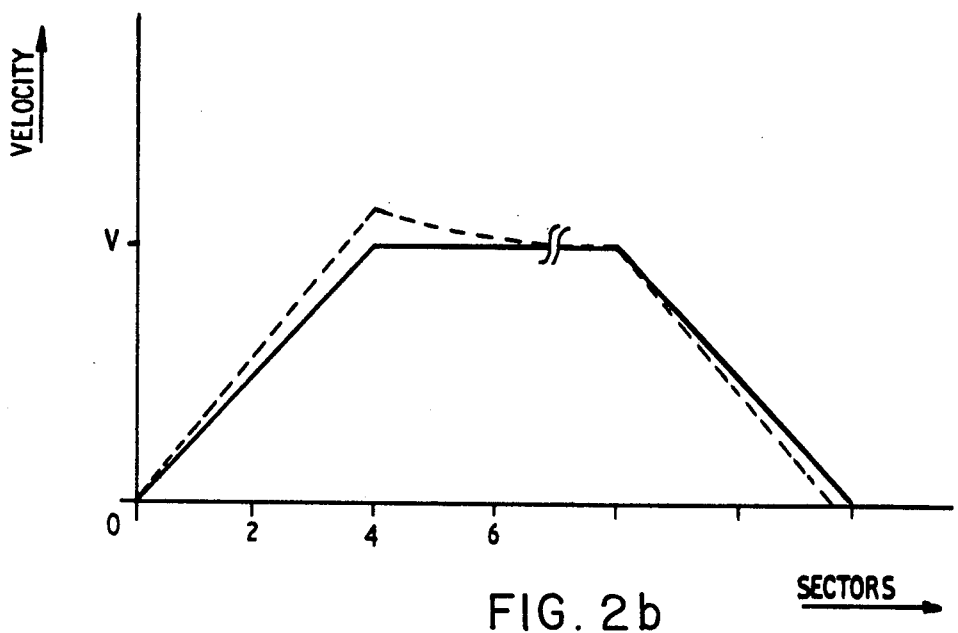

A track access over n tracks is shown in FIG. 2a which shows the access position curve and FIG. 2b which shows the access velocity curve of the head 3. Initially, the head 3 is accelerated across the tracks during a first period by means of a constant current supplied to the actuator 4 from power amplifier 5. The power amplifier is itself energized by being connected to a voltage source through three position switch 20 controlled by control logic 14. The duration of the acceleration period is selected in this embodiment of the invention to be equal to the duration of four servo sector periods, a servo sector period being defined as the time lapse between corresponding points on two successive sector pulses and equal therefore to the duration of a sector-timing pulse on line 13. The current is chosen so that nominally the head 3 will have reached the on-track position of the next adjacent track, that is track $t_1$, at the end of this acceleration period. The velocity V attained by the head after constant acceleration over four sector periods is such that if the current in the actuator is turned off, the head will continue to coast across tracks at the rate of one track every two sector periods. This coast velocity is maintained constant during a second period by taking samples of the position error signal, not every sector as in track-following mode, but every other sector occurring at the on-track positions during the access. These sampled alternate servo sectors are fed into the same position loop as that used during track-following mode. Since the sectors sampled are those which occur when the head crosses the on-track position during the access, the position loop is unaware of the head access movement and responds in the usual manner driving the actuator in a direction tending to reduce any position error of the servo samples to zero. The dashed curves in FIG. 2 illustrate an access in which the initial acceleration is too high causing the head to cross the first track at a velocity in excess of the desired velocity V. During the coast period the position error signals derived by sampling the alternate servo sectors are fed to the closed loop and have the effect of slowing the head 3 by causing appropriate energization of actuator 4 precisely as occurs during track-following mode. If the head is moving at the desired velocity V represented by the solid curves in FIG. 2, then the sampled position error signal is zero as in the case when the head 3 is exactly on-track in track following mode.

The head is brought to rest at the end of the access operation by decelerating with a constant current of opposite polarity to that used during the accelerate period applied to the actuator 4 from the power amplifier 5. As before, the power amplifier is itself energized by being connected through switch 20 to a voltage source, this time of opposite polarity to that used during the acceleration period. Since the deceleration period is the exact opposite of the acceleration period, it is commenced one track from the destination track tn and has a duration of four servo sector periods. The dashed curves show the case where the deceleration is too high causing the head to overshoot the destination track tn before being captured by the track-following servo which, during track-following mode, samples all servo sectors.

The servo sampling rate when track-following is 1.8KHz but only 900Hz when track accessing. Accordingly, different compensator characteristics are required for the two different modes of operation in order to stabilize this type 2 servo loop. A signal is supplied from control logic 14 over line 27 to switch the value of the timing capacitor in the lead network of compensator 19 from one value when track-following to another value when track accessing. This is quite simply achieved by automatically connecting an additional capacitor in parallel with the usual lead network capacitor of the compensator 19 under control of the up-level signal on line 27 when the system is track accessing. The increased capacitance of the compensator lead network during track accessing has the effect of reducing frequency of the network allowing operation at the lower sampling frequency. Apart from switching the input capacitance described above, the compensator is quite conventional and no further details are given in this specification.

Figure 3:
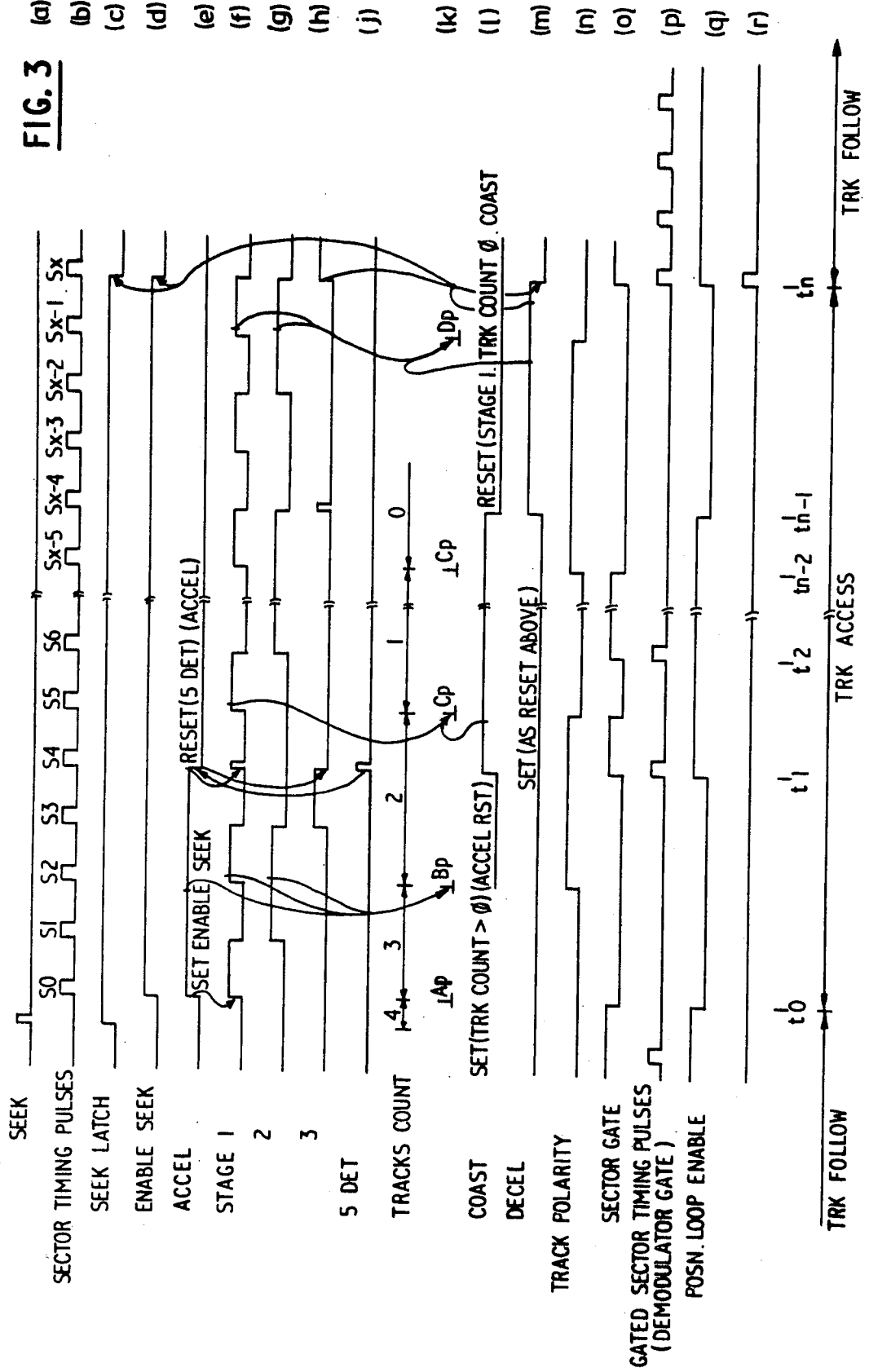
FIG. 3 including 3a-h and 3j-s shows waveforms of control signals to various parts of the storage apparatus.

The control signal supplied to, and those generated by the control logic 14 during track following and track accessing operations are shown in FIG. 3. Details of the control logic 14 are shown in FIG. 4 and includes the following main components:

1. a seek latch 33 which is set by a seek pulse, waveform (a), to indicate the start of a track access operation. The seek latch output is shown as waveform (c);
2. an enable seek latch 34 which is set by the output from the seek latch 33 and a sector pulse on line 13 and remains set for the duration of the track access operation. The output from this latch called the seek enable signal is shown as waveform (d);
3. an accelerate latch 35 which is set at the start of a track access operation by the output from the enable seek latch 34 and remains set for the duration of the acceleration period. The output from this latch called the accelerate signal is shown as waveform (e);
4. a coast latch 36 which is set at the end of the acceleration period and remains set for the duration of the coast or constant velocity period. The output from this latch called the coast signal is shown as waveform (1);
5. A decelerate latch 37 which is set at the end of the coast period and remains set for the duration of the deceleration period. The output from this latch called the decelerate signal is shown as waveform (m);
6. A track counter 38 which is loaded at the start of an access operation with the number of tracks to be crossed during the access. Counter decrementing pulses are shown as waveform (k);
7. a three stage sector counter 39 which counts sector pulses during the acceleration and deceleration periods. The three stages of the counter during access are shown as waveforms (f), (g) and (h) respectively.

Figure 4:
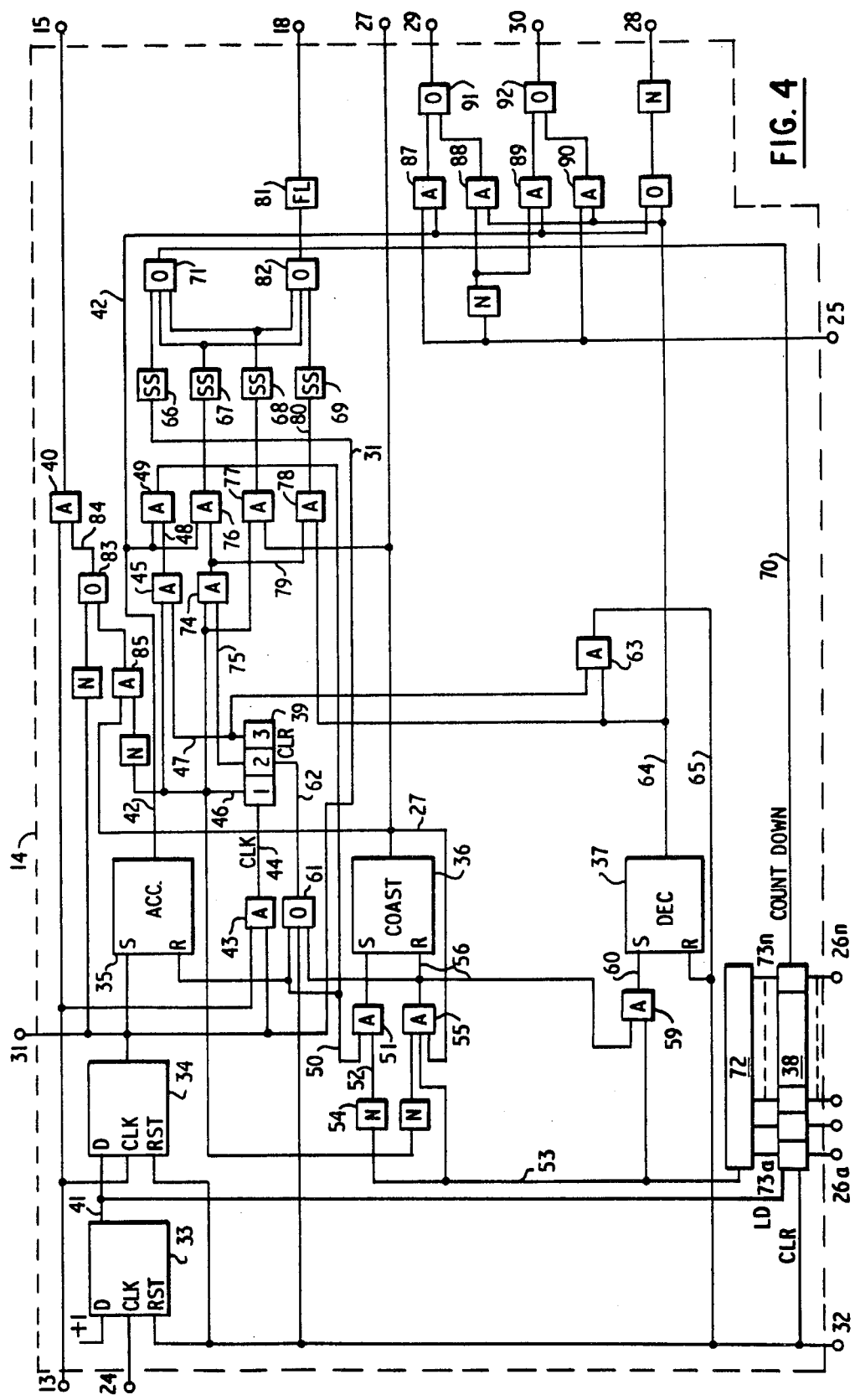
FIG. 4 shows details of control logic forming part of the storage apparatus.

Input and output lines to and from the control logic 14 have the same reference numberals in FIG. 4 as they do in FIG. 1. A detailed description of the operation of the apparatus will now be given mainly with reference to FIG. 1, FIG. 3 and FIG. 4.

TRACK FOLLOWING MODE

Prior to the initiation of a seek operation the head 3 is assumed to be in track following mode over a data track $t_o$ on the disk 1. The control logic latches 33, 34, 35, 36, and 37 are all in the reset condition and counters 38 and 39 are both cleared. The outputs from accelerate latch 35 and decelerate latch 37 are inverted to provide a signal on line 28 which is used to close contact a of simple transistor three position switch 20. Thus the apparatus is maintained in track following mode at all times except during the acceleration and deceleration periods. The signal on line 28 is shown as waveform (q) and is called the position loop enable signal. Sector timing pulses S, waveform (b), supplied over line 13 to the control logic are gated by AND-gate 40 straight through the control logic 14 onto line 15. The gated sector timing pulses form the demodulator gating pulses waveform (p) used during track following to enable the demodulator 16 to sample all sectors of servo information on line 17 derived from the track being followed. In this example it is assumed that track $t_o$ is an even numbered track, so the track polarity signal, waveform (n) supplied over line 18 from control logic 14 to the demodulator 16 is at its down-level. The production of this signal shown as waveform (n) will be described in detail later. Finally, during track following mode the normal compensator characteristics are required and accordingly the compensator 19 is unmodified, and the signal, which will be seen later to be the coast signal, waveform (1), from control logic 14 over line 27 to compensator 19 is at its down level.

1. TRACK SEEK MODE

A track access or seek operation is initiated by a seek signal, waveform (a), supplied over line 24 to the clock input of seek latch 33. Since the data input of the seek latch 33 is held permanently positive the latch 33 is set by the leading edge of the seek pulse. The seek latch output, waveform (c), appearing on line 41 is supplied to the data input of enable seek latch 34. This latch is accordingly set by the leading edge of the next sector timing pulse $S_o$, waveform (b) supplied over line 13 to its clock input. The resultant seek enable signal from latch 34 remains up during the entire seek operation and is supplied as a second input on line 31 to OR-gate 12. The output from OR-gate 12 on line 11 inhibits the read electronics 22 during track access time. The output from latch 34 is also used to set the accelerate latch 35. Accordingly, the position loop enable signal, waveform (q), on line 28 falls to its down-level and contact a of switch 20 is opened breaking the position loop. During the period that the accelerate latch is set a control signal is supplied either on line 29 or line 30 to close either contact b or contact c of switch 20 as will be described later. Which one of these two switch contacts is closed depends on the direction of access to be performed. In the notation adopted for IN and OUT seeks, contact b is closed to connect the power amplifier 5 to a source of positive potential (+V) to produce acceleration in the IN-direction required for an IN seek, whereas contact c is closed to connect the power amplifier 5 to a source of negative potential (−V) to produce acceleration in the OUT direction required for an OUT seek.

AND-gate 40 is enabled to pass sector pulses S supplied over line 13 only when the output from OR-gate 83 on line 84 is at an UP-level. Accordingly when the output from seek enable latch 34 rises this input to AND-gate 40 is inhibited as represented by waveform (o). Consequently, no sector timing pulses waveform (p) are supplied over line 15 to demodulator 16 during the acceleration period. The enable seek signal on line 31 is further supplied as one input of AND-gate 43 which has the sector timing pulses on line 13 supplied to the other input. Sector timing pulses, waveform (b), are therefore passed by AND-gate 43 to its output line 44 during enable seek time and are counted by three stage binary counter 39. It is seen that with this arrangement, the sector timing pulse $S_o$ used to set the enable seek latch 34 is itself gated through AND-gate 43 as the first pulse to be counted by counter 39. The fifth sector timing pulse $S_4$ marks the end of the accelerate period. Four sector periods have now elapsed and the head has moved to lie over the first track $t_1$ of the access. AND-gate 45, connected by line 46 to stage 1 and by line 47 to stage 3 of the counter, detects the count of five condition reached on receipt of the fifth sector timing pulse $S_4$. Its output on line 48 is itself supplied as an input to further AND-gate 49 which is enabled by the accelerate signal over line 42 from the accelerate latch 35. The gate signal on output line 50 of AND-gate 49 is used to reset accelerate latch 35 terminating the accleration period, waveform (e), after four sector periods. The signal on line 29 or line 30 is also terminated at this time as will be seen later and contact b or c of switch 20 is again opened. The position loop enable signal, waveform (q), on line 28 is raised as the inverse of the accelerate latch output and contact a of switch 20 is closed to complete the position loop once again. The acceleration reset signal on line 50 is supplied through OR-gate 61 over line 62 to clear the contents of counter 39.

2. CONSTANT VELOCITY PERIOD

The gated signal on line 50 from AND-gate 49 is additionally used to set the coast or constant velocity latch 36. The signal on line 50 is supplied as one input to AND-gate 51 which is enabled by a signal on its other input 52 during all but the last track of the seek operation. The accelerate latch reset signal is therefore simultaneously gated by AND-gate 51 to set the coast latch 36. The coast latch 36 remains set supplying a coast signal, waveform (l), at its output until the penultimate track of the access when the latch is reset. During this constant velocity or coast phase, AND-gate 40 is enabled by the ZERO condition of stage 1 of counter 39 to supply alternate sector timing pulses, waveform (p), on line 15 at sector times S4, S6 . . . to gate alternate servo sectors appearing on line 17 through the demodulator 16. The sectors gated through the demodulator 16 are those which occur as the head passes over the on-track positions during its access across the tracks.

Since the servo sampling frequency is now halved, the characteristics of compensator 19 need to be modified as previously explained. The coast signal on line 27 from coast latch 36 is supplied as a compensator modify signal to switch the characteristics as previously described. As the head continues to move over the tracks t during the access, the track polarity signal, waveform (n), supplied over line 18 to demodulator 16 changes polarity to indicate to the demodulator when odd numbered and even numbered tracks are being crossed. The position loop uses the position error signals gated through the demodulator 16 under control of the demodulator timing pulses, waveform (p), on line 15 and the track polarity signal, waveform (n) on line 18 to maintain the coast velocity of the head substantially constant as previously explained.

When the head reaches the penultimate track tn-1 of the access, a signal is raised on line 53 and gated through ANDgate 55 over line 56 to reset the coast latch 36. AND-gate 55 is enabled to pass the coast latch reset signal by two further inputs, one being the coast latch output on line 27 and the other on line 58 being supplied when stage 1 of counter 39 stores a zero. This latter signal is obtained by inverting the output on line 46 providing, in the presence of the penultimate track signal on line 53, precise timing for the gating operation by the sector pulse Sx-4 signalling the start of the deceleration period of the access operation. The coast latch reset signal on line 56 is passed via OR-gate 61 over line 62 to clear sector timing pulse counter 39. The termination of the coast latch output on line 27 switches compensator 19 to its unmodified condition ready for normal track following at the end of the access operation.

3. DECELERATION PERIOD

The decelerate latch 37 is set by the coast latch reset signal on line 56 and the penultimate track signal on line 53 gated through AND-gate 59 over line 60. The decelerate signal, waveform (m) appears on output line 64 and is used to raise a signal on line 30 or on line 29 to close either contact c or contact b of switch 20. Again which one of the two switch contacts is closed depends on the direction of access being performed. For example, if contact b was closed to produce the acceleration for an IN seek then contact c is closed to produce deceleration at the end of the access. Alternatively, if contact c was closed to produce the acceleration period for an OUT seek then contact b is closed to produce the deceleration at the end of the access. Since the coast latch is reset AND-gate 85 is closed and no demodulator gating pulses, waveform (p) are passed by AND-gate 40 over line 15 to the demodulator 16.

The end of the deceleration period and the entire access operation is signalled by the fifth sector timing pulse Sx counted by the counter 39 during the deceleration period. This is detected by AND-gate 63 which is enabled during the entire deceleration period by the deceleration signal, waveform (m), on line 64 to gate the signal from stage 3 of counter 39 to line 65 as the reset signal for the decelerate latch 39. The same signal is used to reset both the seek latch 33 and the seek enable latch 34 and to clear counter 39 through OR-gate 61 thus terminating the track access operation. The deceleration period lasts four sector periods at the end of which time the head is stationary over the destination track tn. The output from AND-gate 63 is supplied over line 32 to the control unit 23 to indicate the completion of the access operation. The position loop enable signal, waveform (q), is raised once again on line 28 since outputs from accelerate latch 35 and decelerate latch 36 are both down to close the position loop for track following over the destination track tn. All subsequent servo sectors on line 17 are thereafter gated through the demodulator 16 and normal track following continues until further seek instructions are received from the external control unit 23. The control of sector gating will now be described in more detail for complete clarity.

The operation of the control logic 14 so far described has assumed the production of a signal on line 53 indicating when head 3 reaches the penultimate track of the access. This signal is produced by the track counter circuits which will now be described.

TRACK COUNTER OPERATION

Signals representing in binary form the number of tracks to be crossed are supplied over input lines 26a to 26n of track counter 38. The counter is loaded with this number by the set output of seek latch 33 which has its output line 41 connected to the load input of the counter 38. The counter 38 is initially decremented by unity by a pulse Ap, waveform (k), from single shot 66 fired in response to the raising of the enable seek signal on line 31 to supply a count down pulse over line 70 via OR-gate 71. Since the contents of the counter are immediately decremented at the start of the access operation and are thereafter decremented by unity each time a track is crossed, the counter contents will be zero when the penultimate track tn-1 of the access is reached. Accordingly a detect zero gate 72 connected to each stage of the counter 38 over lines 73a to 73n detects the zero condition of each of the n stages of the counter and supplies the penultimate track signal on its output line 53.

Subsequent countdown of the counter occurs at midtrack positions. Accordingly, counter 38 is next decremented at sector timing pulse S2 time during the acceleration period. This is achieved by detecting the count of three condition of sector timing pulse counter 39 in AND-gate 74 connected by line 46 to stage 1 and line 75 to stage 2 of the counter respectively. The output from AND-gate 74 is gated by further AND-gate 76 enabled during the accelerate period to fire single shot 67. The single shot pulse Bp, waveform (k), is passed as a count down pulse by OR-gate 71 to decrement the counter. The mid-track positions during the constant velocity or coast period occur on the leading edges of the odd sector timing pulses S5, S7 . . . Thus AND-gate 77 enabled during the coast period and connected to line 46 of counter 39 gates the ONE conditions of stage 1 of the counter, to fire the single shot 68 and produce count down pulses Cp during the coast period. Since the track counter 38 reaches zero when the penultimate track is reached there is no decrementing of the counter during the deceleration phase. However the half track position is detected by AND-gate 78 which has one input supplied on line 79 from the count of three detect AND-gate 74 and has its other input connected over line 64 to be enabled during the deceleration period. An output on line 80 fires single shot 69 producing pulse Dp. These pulses are also used to provide the track polarity signal, waveform (n) as will now be described.

The track polarity signal is required to switch from one level to another each time a track is crossed. Accordingly, a track polarity flip-flop 81 is switched by the track crossing pulses Bp, Cp, . . . Dp supplied to its input from OR-gate 82 and produces the track polarity signal on 18.

In IN/OUT signal on line 25 is logically combined with the accelerate signal on line 42 and the decelerate signal on line 64 to determine which contact b or c of switch 20 is closed during the acceleration and deceleration periods. The logic consists of four AND-gates 87, 88, 89 and 90 and two OR-gates 91 and 92. The operation of the logic is self-evident and the four possible conditions are summarized as follows:

1. ACCELERATE during an IN-Seek, line 29 is energized to close contact b of switch 20.
2. ACCELERATE during an OUT-Seek, line 30 is energized to close contact c of switch 20.
3. DECELERATE during an IN-Seek, line 30 is energized to close contact c of switch 20; and
4. DECELERATE during an OUT-Seek, line 29 is energized to close contact b of switch 20.

This completes the description of the apparatus forming the preferred embodiment of the present invention. Although a sectored servo system has been described, it will be apparent that the invention is equally applicable to systems in which the servo information is continuously available. All that is required in either system is for the servo information to by sampled at times calculated to coincide with the on-track positions of the servo transducer moving across the tracks. Further, it will be apparent that access control need not be limited to a period of constant velocity but can be achieved over any access velocity profile provided the times of the on-track positions are known. The embodiment describes the invention incorporated in magnetic disk apparatus. It is not intended that the invention be limited in this way since it can be used in other position control apparatus with equal effect. Finally, servo information need not be magnetic but could be, for example, in optical form.

What is claimed is:

1. A motion control system for controlling relative motion between two objects along a predetermined path of travel according to a predetermined nominal velocity profile, said system comprising:
- a motor for producing said relative motion in response to motor control signals;
- motor control signal connecting means for connecting motor control signals to said motor;
- position transducer means, associated with said objects, for defining a plurality of reference positions along said predetermined path and for producing an incremental position signal indicative of the magnitude and direction of the displacement of said objects from successive ones of said reference positions;
- a timing means for generating timing signals nominally indicative of the arrival of said objects at predetermined ones of said reference positions when moving according to said predetermined nominal velocity profile;
- sampling means responsive to said timing signals to generate sample values of said incremental position signal representative of any error between the actual position of said objects and said predetermined reference positions;
- feedback signal deriving means for deriving a feedback signal from said sample values of said incremental position signal and for providing said feedback signal to said connecting means as a motor control signal.

2. A motion control system according to claim 1 wherein said predetermined nominal velocity profile consists of an acceleration phase, a constant velocity phase, and a deceleration phase, said system further comprising:
- phase indicating means for indicating the current phase of said motion;
- said connecting means comprising a switch responsive to said phase indicating means to connect a predetermined acceleration motor control signal to said motor during said acceleration phase to cause said objects to attain a predetermined constant velocity, to connect said feedback signal to said motor during said constant velocity phase to maintain said predetermined constant velocity, and to connect a predetermined deceleration motor control signal to said motor during said deceleration phase to bring said objects to rest from said predetermined relative velocity.

3. A motion control system according to claim 2 wherein said phase indicating means comprises an accelerate latch, a constant velocity latch and a decelerate latch, said system further comprising:
- clocking means for providing a stream of regular clock signals; and
- count logic for counting said clock signals and arranged to set and reset said accelerate, constant velocity, and decelerate latches successively at predetermined counts defining the duration of the respective phase of said motion.

4. A motion control system according to claim 3 wherein said timing means includes gating means, arranged to receive said clock signals, and being selectively operable to pass said clock signals as timing signals to said sampling means; and
- timing logic means responsive to at least one of said phase indicating means latch states and to said clock signals to selectively enable said gating means to pass a submultiple of said clock signals as timing signals to said sampling means during said constant velocity phase of said motion.

5. A motion control system according to claim 2 wherein said timing means is arranged to continue to generate timing signals after the completion of said decelerate phase of said motion and wherein said connecting means switch is responsive to completion of said decelerate phase to connect said feedback signal from said feedback signal deriving means to said motor to maintain said objects at a predetermined one of said reference positions.

6. A disk file head positioning system for moving a readback head across a plurality of concentric tracks on a disk record medium, according to a predetermined nominal velocity profile, to position such a head over one of said tracks, said system comprising:
- at least one axially rotatable disk having a plurality of concentric information storage tracks thereon including servo position reference information defining said track centers;
- at least one readback head for reading back signals from said tracks on said disk;
- a motor for moving said head along a fixed path transversely of said tracks in response to motor control signals;
- motor control signal connecting means for connecting motor control signals to said motor;
- timing means for generating timing signals nominally indicative of the arrival of said head over the centers of said tracks when moving according to said predetermined nominal velocity profile;
- sampling means responsive to said timing signals and to said servo position reference information signals readback by said readback head to generate sample values of a position error signal representative of the magnitude and direction of any deviation of the actual position of said head from the nearest of said track centers;
- feedback signal deriving means for deriving a feedback signal from said sample values of said position error signal and for providing said feedback signal to said connecting means as a motor control signal to said motor.

7. A head positioning system according to claim 6 wherein said predetermined nominal velocity profile consists of an acceleration phase, a constant velocity phase, and a deceleration phase, said system further comprising:
- phase indicating means for indicating the current phase of said motion;
- said connecting means comprising a switch responsive to said phase indicating means to connect a predetermined acceleration motor control signal to said motor during said acceleration phase to cause said head to attain a predetermined constant velocity, to connect said feedback signal to said motor during said constant velocity phase to maintain said predetermined constant velocity, and to connect a predetermined deceleration motor control signal to said motor during said deceleration phase to bring said head to rest over a preselected track center from said predetermined velocity.

8. A head positioning system according to claim 7 wherein said servo position reference information is located in a plurality of evenly spaced sectors along each track on said disk, said sectors being aligned from track to track;

said predetermined constant velocity being such that the passage of at least a submultiple of said sectors under said head during rotation of said disk nominally coincides with the passage of said head across track centers.

9. A head positioning system according to claim 8 wherein said disk includes a clock track having regularly spaced clock signals recorded thereon associated with said sectors;

said system further comprising a clock head for reading said clock track and providing a train of clock signals to said timing means coincident with the passage of said sectors beneath said readback head.

10. A head positioning system according to claim 9 wherein said phase indicating means comprises an accelerate latch, a constant velocity latch and a decelerate latch, said system further comprising:

count logic arranged to receive and count said clock signals from said clock head and to set and reset said accelerate, constant velocity and decelerate latches successively at predetermined counts defining the duration of the respective phases of said motion.

11. A head positioning system according to claim 9 wherein said timing means includes gating means, arranged to receive said clock signals, and being selectively operable to pass said clock signals as timing signals to said sampling means; and timing logic means responsive to at least one of said phase indicating means latch states and to said clock signals to selectively enable said gating means to pass a submultiple of said clock signals as timing signals to said sampling means during said constant velocity phase of said motion.

12. A head positioning system according to claim 8 wherein said timing means is arranged to continue to generate timing signals after said head has been brought to rest over said preselected track center, and wherein said switch is responsive to completion of said decelerate phase of said motion to connect said feedback signal from said feedback signal deriving means to said motor to cause said head to follow the center line of said preselected track.

13. A disk file head positioning system having a track follow mode of operation for positioning a read back head to follow a selected one of a plurality of concentric tracks on a rotating disk record medium and a track seek mode of operation for moving such a head between tracks, said system comprising:

at least one axially rotatable disk having a plurality of concentric information storage tracks thereon with servo position reference information recorded in a plurality of sectors along each track, said sectors being radially aligned from track to track;

at least one head for reading back information bearing signals from said tracks on said disk;

a motor for moving said head transversely of said tracks in response to motor control signals;

mode indicating means for indicating whether said system is in track follow or track seek mode;

phase indicating means for indicating accelerate, constant velocity, and decelerate phases of said seek motion;

open loop control means responsive to an accelerate phase indication from said phase indicating means to provide an acceleration control signal to said motor to cause acceleration of said head to a predetermined velocity at which passage of said head across track centers is nominally synchronized with passage of said sectors past said head, and responsive to a decelerate phase indication from said phase indicating means to provide a deceleration control signal to said motor to cause deceleration of said head from said predetermined velocity to rest over a preselected track center;

selectively operable feedback control means for deriving a feedback motor control signal related to the magnitude and displacement of said head from the nearest track center from signals read back from said servo information sectors and for feeding back said feedback motor control signal to control said motor, said feedback control means being responsive to a track follow indication from said mode indicating means to derive and feed back signals so as to keep said head centered on a predetermined track, and being further responsive to a track seek mode indication from said mode indicating means and an indication from said phase indicating means of a constant velocity phase of said motion to derive a feed back signal from sectors nominally coinciding with passage of said head across track centers and to feedback said signal to said motor to maintain said head at said predetermined velocity.

* * * * *